(12) United States Patent
Chatufale

(10) Patent No.: US 6,664,572 B2
(45) Date of Patent: Dec. 16, 2003

(54) VALVE SEAL ASSEMBLIES AND METHODS

(75) Inventor: Vijay Chatufale, Missouri City, TX (US)

(73) Assignee: HP&T Products, Inc., Stafford, TX (US)

( * ) Notice: Subject to any disclaimer, the term of this patent is extended or adjusted under 35 U.S.C. 154(b) by 124 days.

(21) Appl. No.: 09/911,148

(22) Filed: Jul. 23, 2001

(65) Prior Publication Data

US 2003/0015681 A1 Jan. 23, 2003

(51) Int. Cl.[7] .............................................. F16K 25/00
(52) U.S. Cl. ........................ 257/172; 251/309; 251/329
(58) Field of Search ................................. 251/328, 329, 251/326, 309, 170, 171, 172

(56) References Cited

U.S. PATENT DOCUMENTS

| 3,013,769 | A | * | 12/1961 | Volpin .......................... 251/174 |
| 3,114,561 | A |   | 12/1963 | Creath et al. |
| 4,434,967 | A | * | 3/1984  | Vanderburg .................. 251/328 |
| 4,741,509 | A |   | 5/1988  | Bunch et al. |
| 4,878,651 | A |   | 11/1989 | Meyer, Jr. |
| 5,029,812 | A | * | 7/1991  | Haynes ........................ 251/327 |
| 5,201,872 | A |   | 4/1993  | Dyer |
| 5,341,835 | A | * | 8/1994  | Lanning, II .................. 251/328 |
| 5,727,775 | A | * | 3/1998  | Rodger et al. ............... 251/328 |
| 6,260,822 | B1 |  | 7/2001  | Puranik |
| 6,279,875 | B1 | * | 8/2001  | Chatufale .................... 251/172 |

* cited by examiner

Primary Examiner—John Bastianelli
(74) Attorney, Agent, or Firm—Slater & Matsil, L.L.P.

(57) ABSTRACT

Valve sealing assemblies and methods of sealing a valve engaging member to a valve body. A first seat member is fixedly disposed within a valve body pocket. Two seal rings are disposed between a valve pocket and a pocket insert and a seal ring is disposed between the pocket insert and a seat member to provide a downstream seal. A built-in lip on one of the seat members and an accommodating groove on the other seat member prevent debris from entering the space between the two seat members. A retainer ring on the exterior annular surface of pocket insert seat member retains the pocket insert within valve body. A retainer ring on the exterior annular surface of the seat member retains the seat member within the pocket insert.

42 Claims, 10 Drawing Sheets

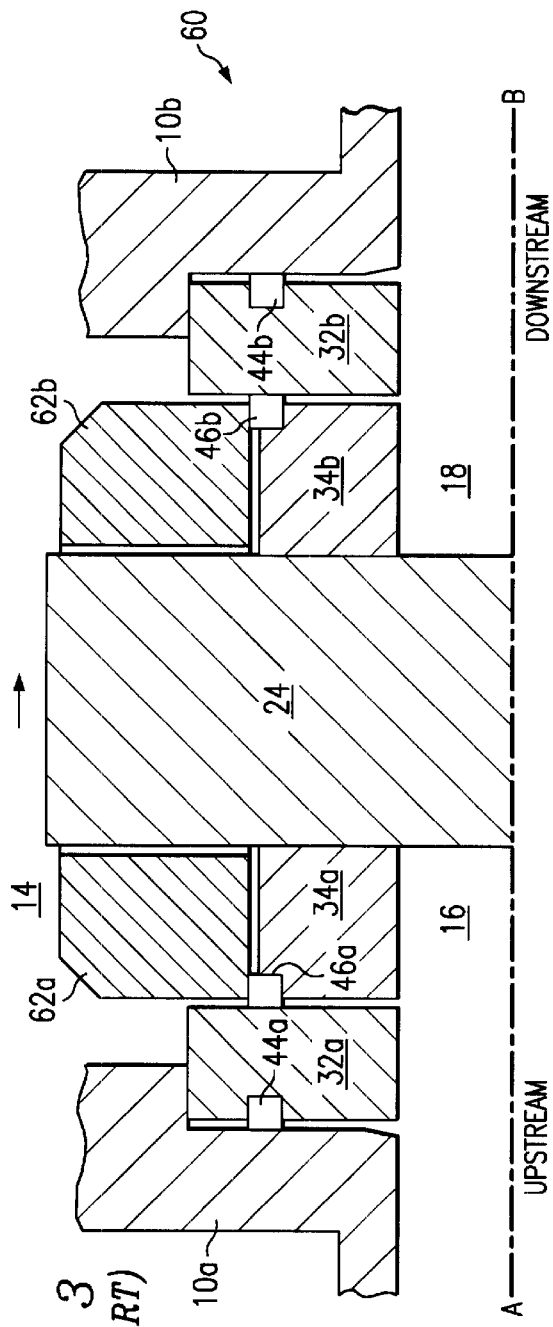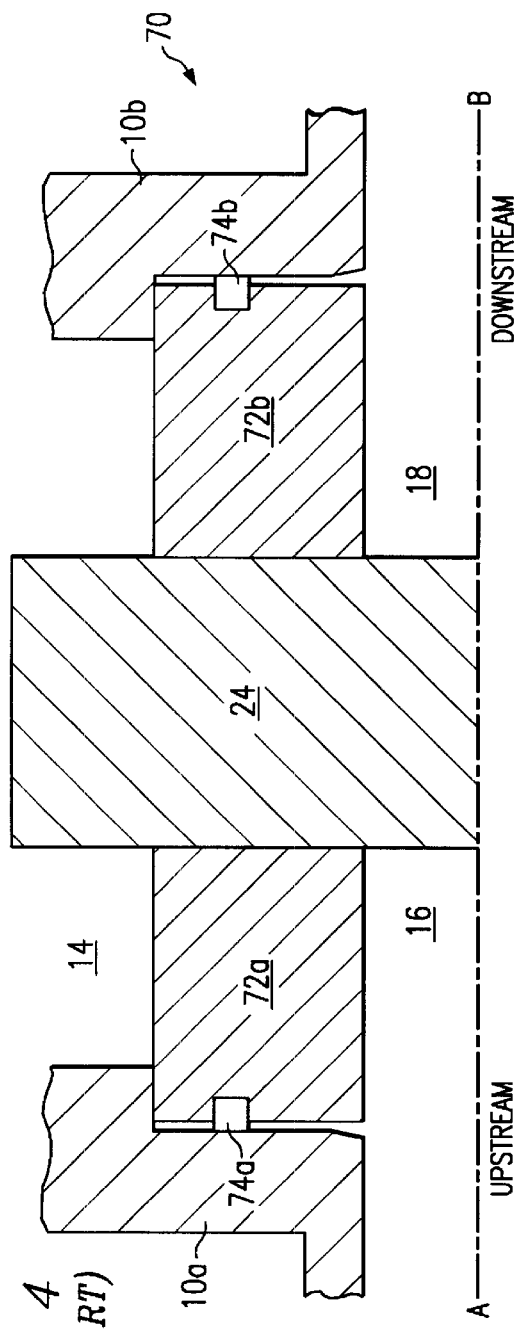
FIG. 3 (PRIOR ART)
FIG. 4 (PRIOR ART)

VALVE SEAL ASSEMBLIES AND METHODS

TECHNICAL FIELD

The present invention relates generally to valves used in oilfield and, more particularly, to seal assemblies for valves and methods of sealing valves.

BACKGROUND

Various types of valves are used in oilfield well exploration, drilling, and production equipment. Valves are coupled to a pipeline and are typically used to shut off or turn on the flow of a fluid, such as a liquid, gas or both. Valves are typically either unidirectional or bi-directional. In a unidirectional valve, the valve has to be placed only in one unique way in a pipeline so as to match the pressure direction. In a bi-directional valve, either side of the valve can be used as the upstream side, which allows the valve to be placed in a pipeline without any specific side facing the direction of pressure. Valve sealing components are usually symmetrical for ease of installation and maintenance and to achieve bi-directionality.

A gate valve is a type of valve that includes a substantially rectangular-shaped gate that is moved by an operator in and out of the valve body to control the fluid. The operator may be manual or may be actuated hydraulically, pneumatically or electrically, for example. A gate valve also includes an annular or ring-shaped seat member that seals against the gate. Depending on gate valve design, one seat member may be disposed on either side of the gate, or alternatively, additional seat members may be disposed adjacent the seat member, which members are involved in the sealing of the valve. The additional seat members seal the passage between the seat member and body pocket.

A valve body pocket generally houses the seal assembly. A valve seal assembly generally includes sealing members such as the seat member adjacent the valve engaging member and other associated seat members which may be referred to as a body bushing or pocket insert, as examples. A seal assembly also generally includes at least one seal ring, which provide a seal between the various seat members, valve body pocket and the gate. Expanding gate valves utilize expanding gate assembly structures comprising a gate element and segment, which are adapted to expand transversely of one another against the sealing rings.

Another type of valve design is a plug valve, where a cylindrical plug having a bore in the center thereof is used to either block fluid flow, or to allow fluid to pass through the valve by rotating the plug. When the plug bore is aligned in parallel with the valve bore, the valve is open and fluid flows through the plug. When the plug bore is aligned perpendicular to the valve bore, the valve is closed and fluid is blocked from flowing through the plug.

Gate valves are classified as either downstream or upstream sealing. For downstream sealing gate valve designs, the sealing is done at the downstream side of the valve. The downstream side of the valve is the side farthest from the pressure source. Therefore, a valve having a downstream sealing design seals on the side of the valve farthest from the pressure source. In contrast, a valve having an upstream sealing design seals on the side of the valve closest to the pressure source.

Various types of seal assemblies have been devised for such valves. With many of these, such as where the seats are press-fit into seat pockets in the valve body, the seats must be installed or removed for repair purposes using special tools and associated costly procedures.

SUMMARY OF THE INVENTION

Embodiments of the present invention achieve technical advantages as a valve seal assembly having an improved seal arrangement. Two seal members include a seat member adjacent a valve engaging member, and a pocket insert adjacent the seat member. The pocket insert fits fixedly within the valve body. A seal ring is disposed between the seat member and pocket insert, and two U-shaped seal rings are disposed between the pocket insert and the valve body.

Disclosed is a preferred embodiment for a valve sealing assembly for sealing a valve engaging member to a valve body. The sealing assembly includes a first annular seat member adapted to fixedly sealingly fit within the first annular valve body pocket, the first seat member having a substantially L-shaped cross-section, the L-shaped cross-section having a bottom and a side. A first annular groove is disposed within the first seat member L-shaped cross-section bottom, a second annular groove is disposed within the first seat member bottom, the second annular groove positioned concentrically with the first annular groove, and a first seal ring is disposed between the first seat member and the first valve body pocket within the first seat member first groove. A second seal ring is disposed between the first seat member and the first valve body pocket within the first seat member second groove, a second annular seat member is adapted to sealingly fit within the first seat member, the second seat member including an annular groove disposed over the first seat member L-shaped bottom, the second seat member being adapted to sealingly couple to the valve engaging member first face, and a third seal ring is disposed between the second seat member and the first seat member within the second seat member groove.

Also disclosed is a valve sealing assembly for sealing a valve engaging member to a valve body, the sealing assembly including a first annular seat member adapted to sealingly fit within one of the annular valve body pockets, the first seat member having a substantially L-shaped cross-section, the first seat member having an annular groove along the side exterior. At least one seal ring is disposed between the first seat member and the valve body pocket, and a second annular seat member is adapted to sealingly fit within the first seat member, the second seat member being adapted to sealingly couple to the valve engaging member. A first retainer ring is adapted to fit within the first seat member groove, wherein the first retainer ring is adapted to retain the first seat member within the valve body pocket, and at least one seal ring disposed between the first seat member and the second seat member.

Further disclosed is a valve sealing assembly for sealing a valve engaging member to a valve body, the sealing assembly including a first annular seat member adapted to sealingly fit within one of the annular valve body pockets, the first seat member having a substantially L-shaped cross-section, and at least one seal ring disposed between the first seat member and the valve body pocket. A second annular seat member is adapted to sealingly fit within the first seat member, the second seat member being adapted to sealingly couple to the valve engaging member and including an annular groove along the exterior. A first retainer ring is adapted to fit within the second seat member groove, wherein the second retainer ring is adapted to retain the second seat member within the first seat member, and at least one seal ring is disposed between the first seat member and the second seat member.

Also disclosed are methods of sealing a valve engaging member to a valve body about a borehole and a method of retaining a seat member within a valve.

Advantages of embodiments of the invention include providing an improved seal assembly for a valve engaging member. Embodiments of the seal assembly allow fluid to enter the valve cavity from the pipeline bore during pressure applications, and allow the pressure in the valve cavity to bleed with the pipeline bore. Pressure is not trapped in the valve body cavity when the valve engaging member is in the fully closed or open position. Well bore fluid is not passed between the seating element and the body pocket, which prevents erosion and corrosion of the body pocket. The pocket insert is fixed within the valve body pocket and is a sacrificial component, which provides a labor and cost savings by avoiding the repair of valve body pockets. Equilibrium is achieved inside the valve engaging member sealing assembly, preventing damage to the sealing mechanism and components. A support ring disposed within each U-shaped seal prevents the collapse of the U-shaped seals with exposure to pressure. The built-in lip prevents debris from entering the space between two seat members with a built-in lip. This prevents valve failure and prevents damage to seals and seat members. The retainer rings hold the pocket insert within a valve body pocket, or a seat member within a pocket insert, even when the valve bore is in the vertical position. This improves the ease of servicing and repairing the valve, for workmen no longer have to remove the valve and place it horizontally on the ground to repair it.

BRIEF DESCRIPTION OF THE DRAWINGS

The above features of embodiments of the present invention will be more clearly understood from consideration of the following descriptions in connection with accompanying drawings in which:

FIG. 1 illustrates a cross-sectional view of a prior art upstream gate valve sealing assembly having O-ring seals;

FIGS. 2 through 4 illustrate cross-sectional views of prior art gate valve sealing assemblies having solid fluoropolymer resin seals;

Corresponding numerals and symbols in the different figures refer to corresponding parts unless otherwise indicated. Components are shown in substantially conceptual form for ease of explanation and are not intended to represent manufacturing dimensions, sizes or details. The dimensions may be exaggerated to more clearly shown the features of discussion. In each drawing, only the upper portion of the valve seal assembly is shown, although a mirror image of the seal assembly also exists for the lower portion of the valve, which is positioned annularly about a bore having a centerline A-B.

DETAILED DESCRIPTION OF PREFERRED EMBODIMENTS

Prior art gate valves and the problems therewith will be discussed, followed by a description of some preferred embodiments and advantages of the embodiments of the present invention.

Figures 1, 2:
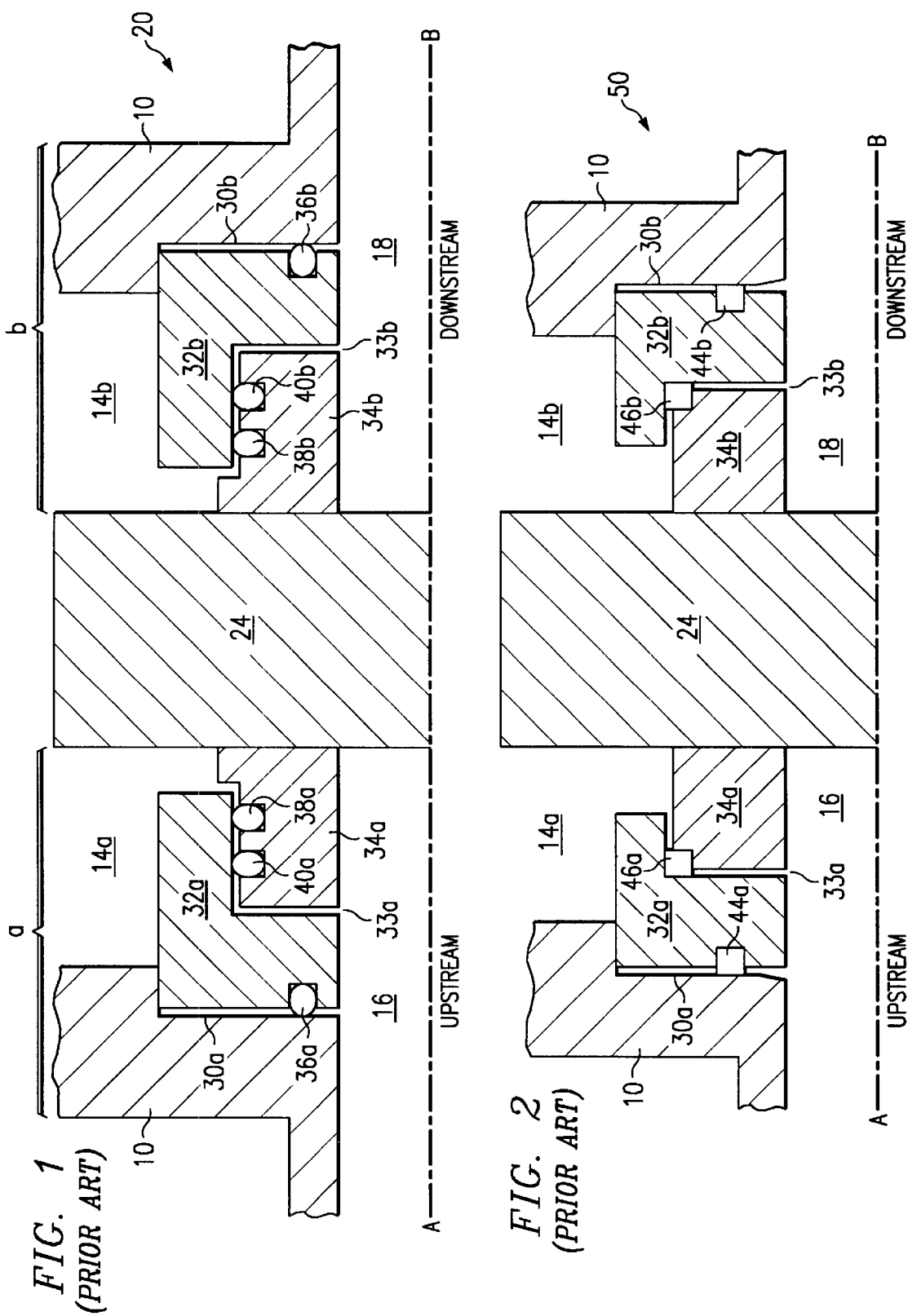

An exemplary type of telescoping valve seat assembly gate valve 20 is shown in the prior art drawing of FIG. 1. FIG. 1 shows an upper portion of the gate valve described in U.S. Pat. No. 4,878,651, issued Nov. 7, 1989, to F. W. Meyer, Jr., which is incorporated herein by reference. Gate valve 20 is positioned over the horizontal axis or centerline A-B of a pipe, not shown. The gate valve 20 includes a gate 24 and valve body 10 with a valve cavity 14 (14a and 14b) within the valve body 10. The gate 24 is inserted and removed transversely and at a right angle into the valve body 10 by an operator, not shown, to close and open the valve 20, respectively. The valve 20 is symmetric, with an upstream side ("a" components about bore 16) and a downstream side ("b" components about bore 18). An annular pocket insert seating member 32 fits within the pocket 30 of the valve body 10. An annular seat member 34 fits within pocket insert 32 and also forms a metal-to-metal seal with gate 24 when the gate 24 is engaged. The pocket insert 32 is also sometimes referred to as a seat retainer 32 because it holds seat member 34 in place.

O-ring 36 provides a seal between the valve body pocket 30 and pocket insert 32. O-rings 38 and 40 provide a seal between pocket insert 32 and seat member 34. A similar seating assembly is positioned symmetrically on both sides of the gate 24.

The gate valve 20 provides an upstream seal when the gate 24 is engaged as follows. When fluid enters the upstream flow passage 16, (during use for oil or gas exploration, for example) O-ring 36a compresses to fill the groove in the pocket insert 32a, blocking the flow of fluid into valve cavity 14. Pocket insert 32a is pressed against seat member 34a and O-ring 40a compresses to form a seal. Seat member 34a is pressed against gate 24 in a metal-to-metal seal. Similarly, when fluid enters the downstream flow passage 18 e.g., during testing, O-ring 36b and 40b provide seals between the pocket 30b and pocket insert 32b, and pocket insert 32b and seat member 34b, respectively.

The gate valve 20 is referred to as a through conduit sealing design because in normal operation, when the gate 24 is engaged, there is no fluid flowing through the valve cavity 14a/14b due to the soft seal provided by O-rings 36/38/40.

Because O-rings are formed from rubber, an organic material that corrodes easily and is subject to the phenomena of explosive decompression, often fluoropolymer resin (e.g., Teflon™) rings are used in a downstream sealing design. Fluoropolymer resin-based seals are inert to most fluids and can withstand higher temperatures; however, they do not provide a soft seal like O-rings do, and must seal while the seating members are in compression.

A prior art downstream-sealing gate valve having fluoropolymer resin seals is shown in FIG. 2. Gate valves using fluoropolymer resin-based seals rely on the compression of the valve body 10, pocket inserts 32a/32b, seat members 34a/34b and gate 24 to produce a seal. When fluid arrives from the upstream direction into cavity 16, fluid flows past fluoropolymer resin seal rings 44a and 46a, into cavity 14a. The pressure builds up, compressing all sealing assembly components together (horizontally, as shown in FIG. 2) in the direction from upstream "a" side towards downstream "b" side. The compression creates a seal at fluoropolymer resin seal rings 46b and 44b, due to seat member 34b compressing against pocket insert 32b, and pocket insert 32b compressing against valve body pocket 30b, respectively, so that no fluid flows into bore 18.

A problem with the prior art valves shown in FIGS. 1 and 2 is that solids and debris such as mud, sand and rocks, for example, may enter the passageway 33 between pocket inserts 32 and seat members 34. This causes wear on the pocket insert 32 and seat member 34, and can damage seals 46, leading to valve failure. Furthermore, if the valve is not used for many hours, the debris can dry and become lodged in the passageway 33. This may prevent the energization of the seat member 34 which is required for the compression seal, particularly when fluoropolymer resin seals are used.

Another problem with the prior art valves shown in FIGS. 1 and 2 is that the pocket inserts 32 slip-fit into the valve body pocket 30, with no retaining means to hold in the pocket inserts 32. When used in the field, a pipe having a gate valve is positioned vertically, e.g., descended down into the surface of the ground or sea. When the valve is disassembled for repairs or servicing and the pipe and valve remain vertical, the lack of a retaining means makes it difficult to replace the pocket insert 32 back within the valve body 30 pocket on the upper seating assembly, because gravity makes the pocket insert 32 fall down. Valve repairmen often attempt rubbing soap on the pocket insert 32 and valve body 30 surfaces to adhere them together long enough to reassemble the valve. This often is not successful, and the entire valve body must be removed from the pipe and placed horizontally on the ground to be serviced.

FIG. 3 illustrates a prior art valve sealing assembly 60 having a body bushing 32a and 32b coupled to seat members 34a and 34b, respectively. Retainer plates 62a and 62b are coupled to seat member 34a and 34b, respectively. Seal rings 46a and 46b comprise solid fluoropolymer resin square rings. The retainer plate 62a and 62b house the seat members 34a and 34b, respectively. Body bushings 32a and 32b are disposed inside the body pockets 10a and 10b. Because seal rings 46a/46b comprise a rigid material such as fluoropolymer resin, there is no memory or spring-back available in these seals. Seal rings 46a/46b are dead seals that will seal only in compression. Therefore, when pressurized fluid enters the upstream side ("a" side), the upstream seals 44a and 46a do not seal, and the pressurized fluid enters into the body cavity 14. The fluid pressure also pushes the closed gate 24 towards downstream ("b" side). This force is sufficient to obtain a seal between the downstream seat member 34b, gate 24, body bushing 32b and the body pocket 10b. Seal rings 44b and 46b on the downstream "b" side go into compression to provide a downstream seal.

However, there are some problems with the seal assembly 60 shown in FIG. 3. The well-bore fluid enters into the body cavity 16 from upstream "a" side between the body pocket 10a and body bushing 32a, as well as between seat member 34a and body bushing 32a. The high-pressure fluid may erode and corrode the valve body pocket 10a, which is an expensive component that must be replaced, repaired or discarded if damaged. A valve body 10 typically contributes a high percentage of the total gate valve cost, and therefore, damage to the valve body 10 pocket increases the cost. Also, solids such as sand particles may enter into the body cavity 14, as in the prior art seal assemblies shown in FIGS. 1 and 2, because there is no mechanism to prevent solids from entering into the body cavity 14. Furthermore, there is no spring-back action from the seal rings 44a/46a/46b/44b because they have no memory. This is problematic in sealing after being used for a time, especially at low pressures such as 300 psi, because there is not enough force at such a low pressure to force the gate 24 downstream and obtain leak-proof sealing from the seal rings 44a/46a/46b/44b downstream. In addition, if the valve bore is positioned vertically, the body bushing 32a or 32b cannot be placed into the body pocket 10a or 10b, because there is nothing to hold it in place; the body bushing 32a or 32b will fall due to gravity.

FIG. 4 illustrates in cross-section another prior art downstream sealing assembly 70. Seal assembly 70 is similar to FIG. 3 except it comprises only one seat member 72a/72b on each side of gate 24. A single solid seal ring 74a/74b comprising a rigid material such as fluoropolymer resin is disposed between seat member 72a/72b and body pocket 10a/10b. The seal assembly 70 also seals in compression, and has the same problems as mentioned for the seal assembly 60 of FIG. 3.

Figure 5:
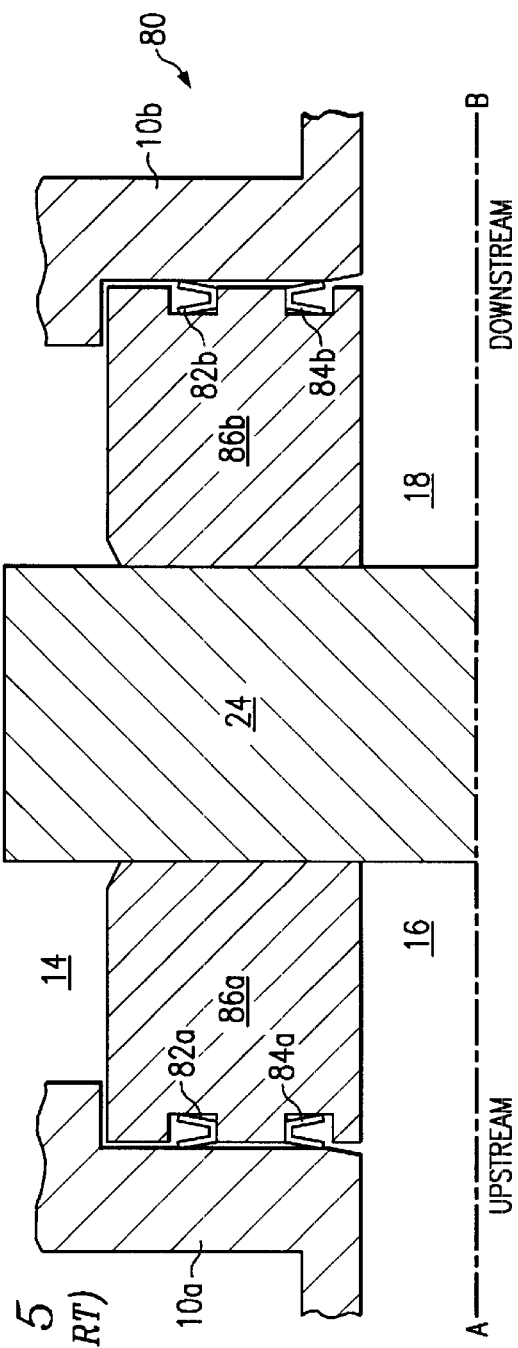
FIGS. 5 and 6 illustrate cross-sectional views of prior art downstream gate valve sealing assemblies having U-shaped seal rings.

FIG. 5 shows a cross-sectional view of another prior art seal assembly 80 that is described in U.S. Pat. No. 4,741, 509, issued May 3, 1988, to Bunch et al., which is incorporated herein by reference. Seal assembly 80 includes two U-shaped seal rings 82a/84a/82b/84b coupled between seat member 86a/86b, respectively. Seal rings 82a/84a/82b/84b comprise polyetheretherketone or polyethersulphone and are unidirectional. Seal rings 82a/84a/82b/84b have built-in springs, and therefore have spring-back action or memory.

Problems with the prior art seal assembly 80 include the seal assembly 80 being a one-piece seat member 86a/86b design that is able to mechanically float. Because there is nothing to stop the movement of the seat members 86a/86b, the well-bore 16 fluid flows between the body pocket 10a and the seat member 86a into the body cavity 14, which increases erosion and corrosion of the body pocket 10a. Also, because the seal rings 82a/84a/82b/84b have a spring-back action, they try to seal upstream, and hence it takes a large amount of time for the well-bore fluid to seep into the body cavity 14 so that the gate 24 can be forced to move downstream to obtain a seal downstream. This increases the amount of time required to test the valve, which is disadvantageous because rig time, especially off-shore rig time, for example, is costly. Furthermore, if the valve bore is positioned vertically, the seat member 86a or 86b cannot be placed into the body pocket 10a/10b, because there is nothing to hold it in place, and it falls due to gravity. Also, solids such as sand particles may enter into the body cavity 14, as in the prior art seal assemblies shown in FIGS. 1–4, because there is no mechanism to prevent solids from entering into the body cavity 14.

Figure 6:
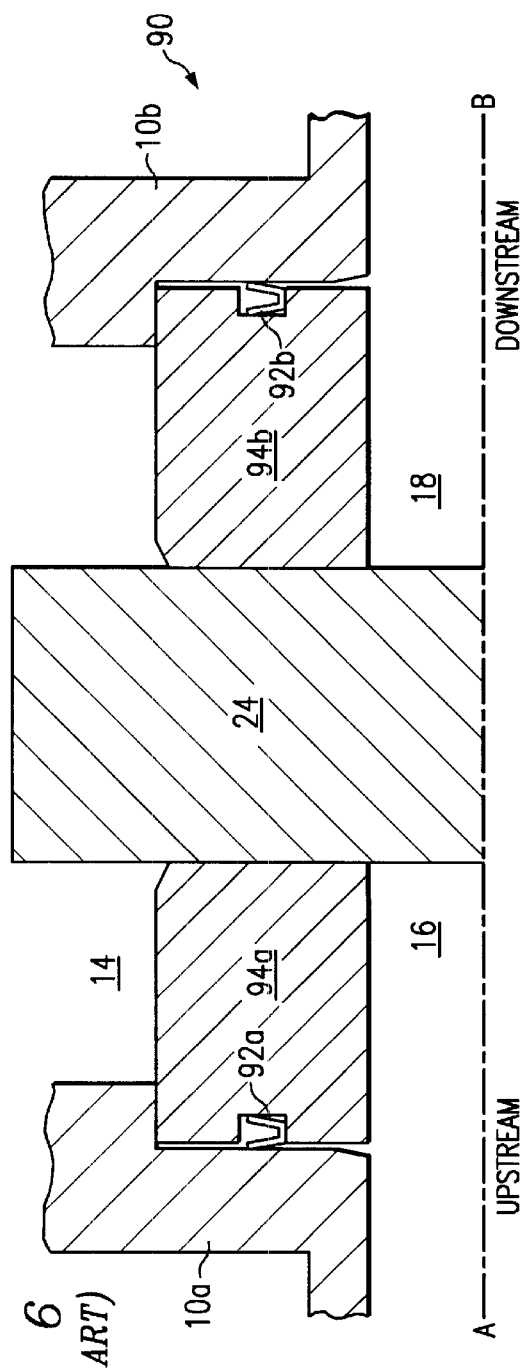

FIG. 6 illustrates a cross-sectional view of another prior art valve seal assembly 90. This arrangement is similar to FIG. 5, except that there is only one U-shaped seal ring 92a/92b disposed between the seat member 94a/94b and the body pocket 10a/10b, rather than two seal rings. Problems posed by the seal assembly 90 are similar to those mentioned above for the seal assembly 80 of FIG. 5.

These problems found in prior art seal assemblies can be alleviated with preferred embodiments of the present invention. Embodiments of the present valve seal assembly will be described herein for both mirror images about a valve engaging member, frequently without reference in particular to the "a" and "b" components on the upstream "a" and downstream "b" sides, respectively.

Figure 7:
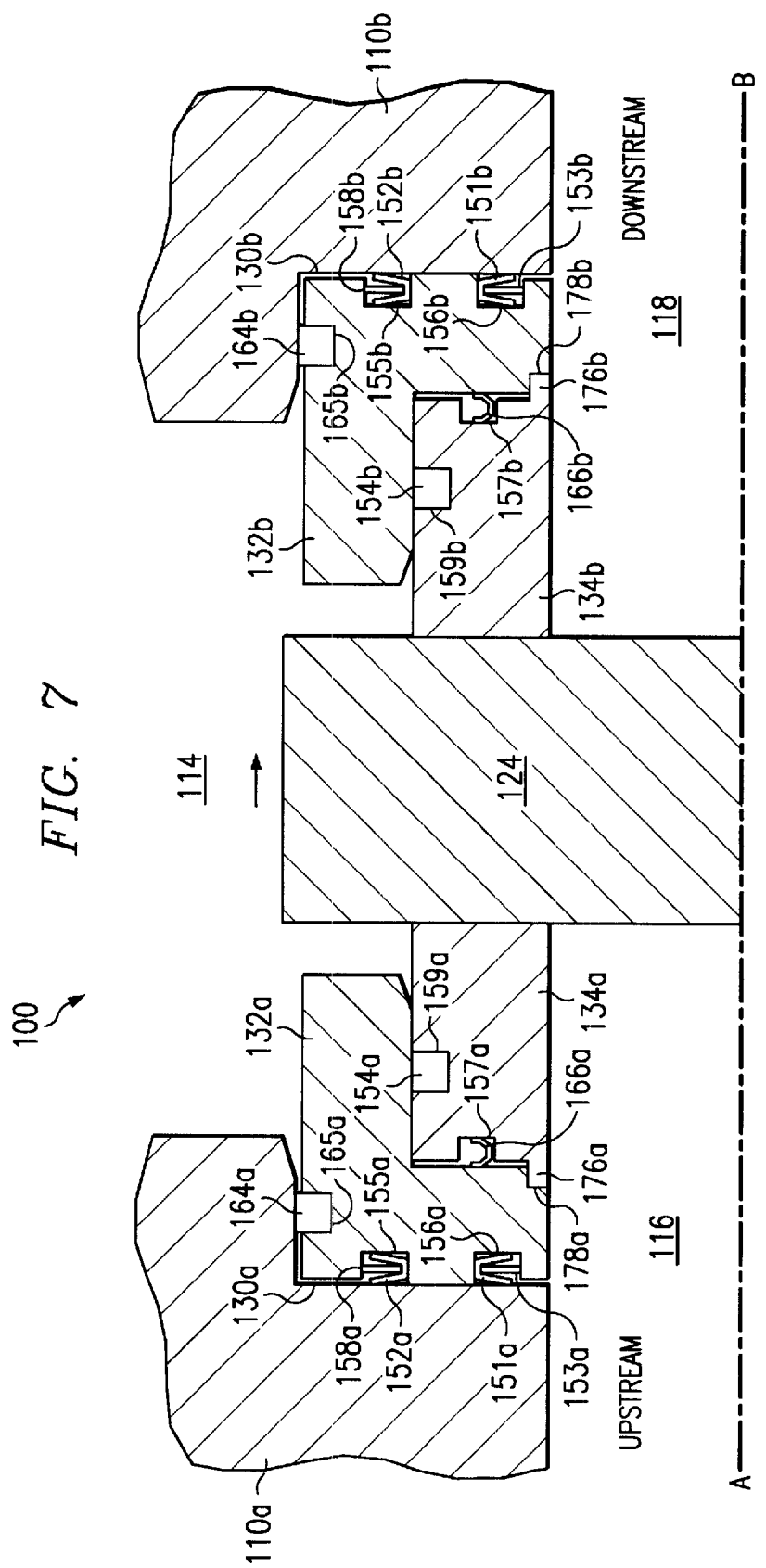
FIG. 7 shows a preferred embodiment of the present invention, including an annular seat member coupled to a pocket insert with a C-shaped metal seal ring coupled therebetween and two U-shaped seal rings disposed between the pocket insert and the valve body pocket, the seat member having a built-in lip region, and support rings being disposed within the U-shaped seal rings.

FIG. 7 illustrates a cross-sectional view of a preferred embodiment of the present invention, a valve seal assembly 100 having an upstream "a" side and a downstream "b" side. On the upstream "a" side, first seat member 132a and second seat member 134a provide a seal between valve body 110a pocket 130a and valve engaging member 124 which may comprise a gate 124. Alternatively, the valve engaging member 124 may comprise a plug or other types of engaging members, as examples.

On the downstream "b" side, first seat member 132b and second seat member 134b provide a seal between valve body 110b pocket 130b. Seat members 134a and 134b are adapted to make a metal-to-metal seal with the surfaces or faces of gate 124 that are perpendicular to the bore 115/118 centerline A-B. Preferably, the seal assembly 100 components 132a/132b/134a/134b are symmetric in order to provide a bi-directional valve. An engagement actuator is coupled to the gate 124, not shown. When the gate 124 is closed, the valve seal assembly 110 is adapted to seal at the downstream "b" side and prevent fluid from flowing downstream into borehole 118, to be described further herein.

First seat member or pocket insert 132 comprises an annular member that is adapted to fit within valve body 110 at pocket 130. Pocket insert 132 is adapted to fixedly fit within valve body 110 (rather than mechanically floating within valve body 110). The fixed coupling of pocket insert 132 may be accomplished by designing the dimensions of the pocket insert 132 such that there is an interference fit with the valve body pocket 130. Alternatively, the fixed coupling of pocket insert 132 to valve body pocket 130 may be achieved by the use of a retainer ring 164, to be described further herein.

Second seat member 134 comprises an annular member that is adapted to fit in a telescoping fashion within pocket insert 132. Valve body 110, pocket insert 132, and seat member 134 preferably comprise steel and alternatively may comprise another material, preferably the same material as the pipe (not shown) that the valve seal assembly 100 is installed on, to prevent corrosion. The cross-section of pocket insert 132 is preferably substantially L-shaped as shown. The pocket insert 132 is adapted to remain fixed, while the seat member 134 is adapted to float mechanically.

In accordance with an embodiment of the invention, a single seal ring 166 is coupled between pocket insert 132 and seat member 134. The seat member 134 preferably comprises a groove 157 adapted to contain seal ring 166. Seal ring 166 preferably comprises a 'C'-shaped ring, as shown. Preferably, C-shaped seal ring 166 comprises metal. Alternatively, seal ring 166 may comprise other seal rings having a square or rectangular cross-section and comprising a metal such as stainless steel, or a fluoropolymer resin, as examples. Metal seal ring 166 preferably has the form of the letter "C" and is placed inside a groove 157 in the seat member 134 face. Preferably, the open part of the C-shape seal ring 166 faces away from the bore centerline A-B. Metal seal ring 166 comprises a unidirectional seal and is designed such that it does not seal any pressure on the upstream side e.g. at 166a and will allow the well-bore fluid to bleed into the body cavity 114 quickly and easily.

After the body cavity 114 is filled with fluid, the gate 124 is forced downstream to obtain a seal. The metal seal ring 166b on the downstream "b" side takes into effect, and seals the fluid pressure, preventing fluid from entering well bore 118 and providing a downstream seal. Metal C-ring 166a/166b is designed such that it has enough spring-back to hold smaller pressures such as 200 psi downstream as well as hold the full working pressure of the valve, which may be up to about 20000 psi, as examples.

Preferably, two seal rings 151/152 are coupled between pocket insert 132 and valve body 110, as shown. Pocket insert 132 preferably comprises two grooves 156/155 adapted to accommodate seal rings 151/152, respectively, and provide a seal. Preferably, seal rings 151/152 comprise spring-energized seals, which are unidirectional and have a memory or spring-back action. Seal rings 151/152 preferably include an outer high-temperature plastic U-shaped body comprising of carbon-filled polytetrafluoroethylene (PTFE), for example. Alternatively, U-shaped seal rings 151/152 may comprise PEEK (polyetheretherketone) or PES (polyethersulfone), as examples. The seal rings 151/152 also preferably comprise an inner spring member coupled to the high temperature plastic body adapted to exert a force outwardly against the upward legs of the U-shaped body and provide a seal against the inner surface of pocket insert grooves 156 and 155, respectively. The inner spring member preferably comprises an alloy such as Elgiloy, and alternatively may comprise other metals, for example. Preferably, seal rings 151/152 have a width that is greater than the width of the grooves 156/155 by about 0.015" to ensure a sufficient seal within the grooves 156/155.

Preferably, optional support rings 158 and 153 are disposed within U-shaped seal rings 152 and 151, respectively, as shown, to help prevent rotation, displacement or collapse of the U-shaped seal rings 152 and 151. Preferably, support rings 158 and 153 are comprised of a heat-resistant thermoplastic such as polyphenol sulfide (e.g., Ryton™), for example. Preferably, supports rings 158 and 153 comprise split rings for ease of installation within the seal rings 152 and 151. Also, preferably, support rings 158 and 153 do not provide a seal but are used primarily for mechanical support. Support rings 153 and 158 permit the lip of the seals 151a, 151b, 158a, and 158b to deflect to relieve the pressure if for some reason pressure enters into the space between the seals 151 and 158, ensuring a seal is made and is maintained even under high pressure. Thus, the support rings 153 and 158 ensure that the U-shaped seal rings 152 and 151 function as unidirectional seals, and prevent U-shaped seal rings 152 and 151 from extruding and collapsing the internal springs when subjected to pressure at the heel of the seal.

The seal rings 151/152/166 may comprise other types of seals according to embodiments of the invention. For example, seal ring 152 may comprise a C-shaped ring such as the one preferably used for seal ring 166, and C-shaped seal ring 152 may be comprised of a metal, for example. Seal ring 151 may comprise a solid annular metal or fluoropolymer resin ring, for example. Seal ring 166 may comprise a square cross-section solid ring comprised of fluoropolymer resin, for example.

In accordance with an embodiment of the invention, a retainer ring or retaining ring 164 is positioned at the exterior annular surface of pocket insert 132 abutting the inner surface of the valve body 110 pocket 130. Pocket insert 132 includes an exterior annular groove 165 near (or at, not shown) the L-shaped corner adapted to accommodate retaining ring 164. Retaining ring 164 is preferably square or rectangular in cross-section. Preferably, retaining ring 164 comprises a compressible material such as a metal, and alternatively, retaining ring 164 may comprise a fluoropolymer resin, as examples. Retaining ring 164 does not provide a seal, but rather, is preferably split to allow fluid to flow around the retaining ring 164. Retaining ring 164 is slightly oversized to achieve an interference fit within the exterior annular groove 165 in, e.g., by about 0.006" with respect to the groove 165 depth to exert a force towards the valve body 110 in order to retain the pocket insert 132 within the pocket 130 in any position of the valve, including the vertical position.

In accordance with an embodiment of the invention, a retainer ring or retaining ring 154 is also positioned at the exterior annular surface of seat member 134 abutting the inner surface of the pocket insert 132. Seat member 134 includes an exterior annular groove 159 adapted to accommodate retaining ring 154. Retaining ring 154 preferably comprises a fluoropolymer resin having a square or rectangular cross-section, as examples, and alternatively, retaining ring 154 may comprise metal, as examples. Retaining ring 154 does not provide a seal, but rather, is preferably split to allow fluid to flow around the retaining ring 154. Retaining ring 154 is slightly oversized e.g., by about 0.002" with respect to the groove 165 depth to exert a force towards the pocket insert 132 in order to retain the seat member 134 within the pocket insert 132 in any position of the valve 100, including the vertical position.

In accordance with an embodiment of the invention, seat member 134 includes a built-in annular lip 176 at the inner annular surface along the bore 116/118 that functions to prevent solids such as mud, sand, dirt, and rocks, for example, from entering the valve body cavity 114. Pocket insert 132 includes an annular groove 178 adapted to accommodate the seat member built-in lip 176. The built-in lip 176 prevents debris from entering the space between pocket insert 132 and seat member 134. To further prevent debris from entering the space between pocket insert 132 and seat member 134, built-in lip 176 and groove 178 may be designed to have a narrower space between them at the lip 176 than near bore 116/118, to be described further herein.

Valve sealing assembly 100 is adapted to seal in the downstream direction, e.g. at the "b" side. A description of the sealing mechanism will next be described. When fluid enters from the upstream side into borehole 116, fluid is prevented from passing by seal ring 151a, which U-shaped seal ring 151a has legs that exert a force outwardly against pocket insert 132a groove 156a and against valve body pocket 130a. Fluid passes by C-shaped seal ring 166a because the "C" opening faces upward, and fluid enters between pocket insert 132a and seat member 134a into cavity 114. Fluid flows within the "a" side in body cavity 114 to the downstream "b" side. By this time, the fluid pressure typically will have built up to a sufficient amount to compress the following elements against one another, laterally from left to right, as drawn: the valve body 110a, pocket insert 132a, seat member 134a, gate 124, seat member 134b, pocket insert 132b and valve body 110b. A downstream seal is formed at the interface of pocket insert 132b and valve body 110b pocket 130b by seal ring 158b and at the interface of pocket insert 132b and seat member 134b by seal ring 166b, preventing the flow of fluid into the downstream borehole 118.

Note that seal ring 151a prevents the passage of well-bore fluid from the upstream "a" side between the seat pocket 130a and the pocket insert 132a, therefore preventing erosion and corrosion of the valve body 110a pocket 130a. Retaining ring 164 retains the pocket insert 132 within the valve body 110 regardless of the position of the valve seal assembly 100. Retaining ring 164 also prevents floating movement of the pocket insert 132, thus allowing the seal ring 151a to seal the fluid pressure on the upstream "a" side.

The valve seal assembly 100 is bi-directional and symmetric, and will provide a seal in either direction. For example, during oil production, fluid flowing from the upstream direction will cause the assembly 100 to seal at the downstream side when the gate is closed. During testing, e.g., when fluid is flown from the downstream side, the assembly 100 will seal on the upstream side. In other words, the seal assembly 100 will seal on the opposite side of the pressure source.

The valve seal assembly 100 is preferably also designed so that when pressure is bled from the line bore 116/118, the pressure releases from the body cavity 114, passing the metal seal 116a on the upstream side between the seat 134a and pocket insert 132a.

Metal seal ring 166 is preferably made out of a mechanically alloyed metal such as Inconel™ made by Inco Alloys International, Inc., which is chemically inert to most wellbore fluids and has a high temperature strength, corrosion and fatigue resistance. Being a metal ring, seal ring 166b retains its physical properties such as spring-back better than other non-metallic seals.

Figure 8:
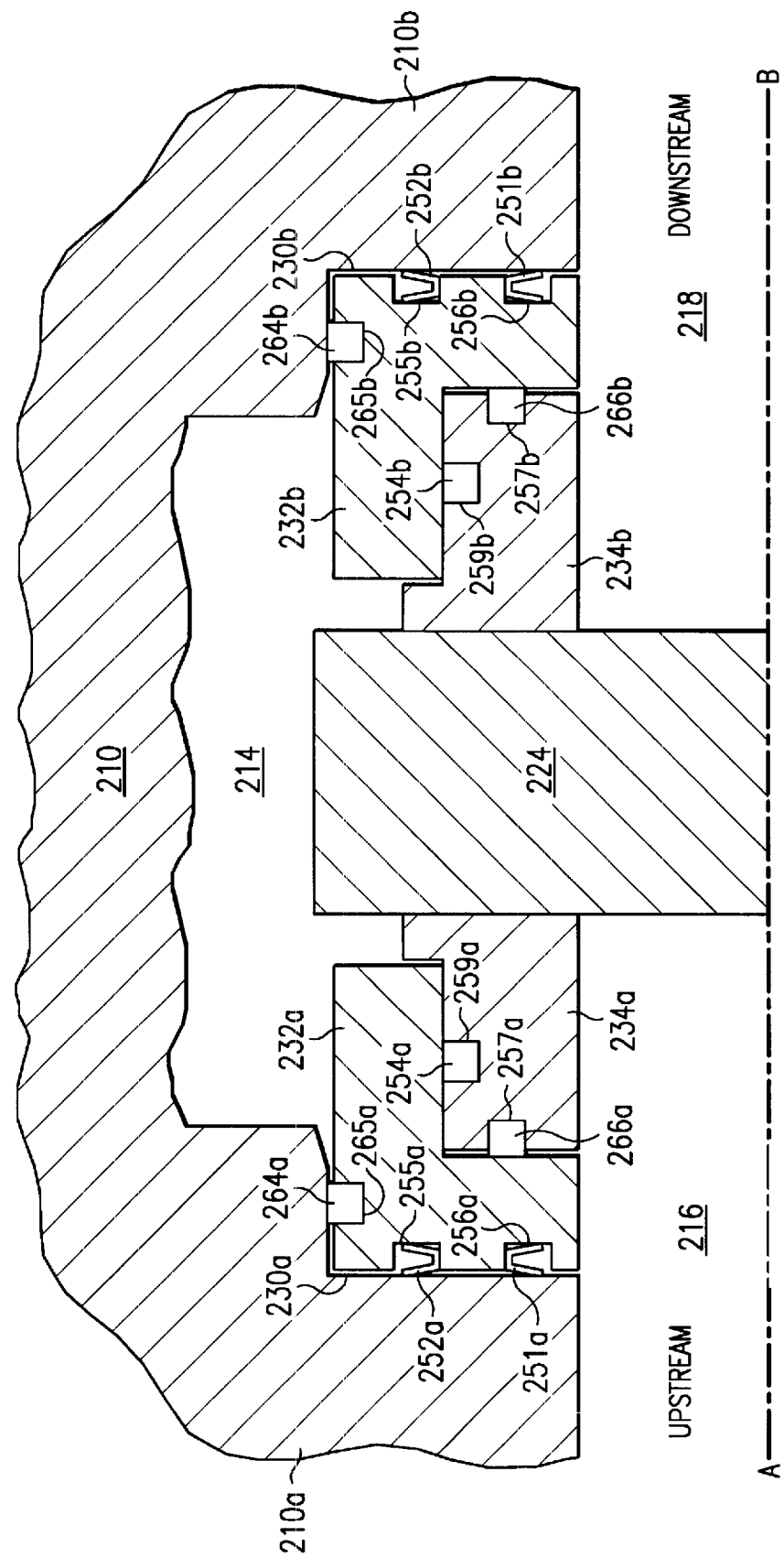
FIG. 8 shows an embodiment having a solid annular fluoropolymer resin seal ring disposed between the pocket insert and the seat member and two U-shaped seal rings disposed between the pocket insert and the valve body pocket.

FIG. 8 illustrates an embodiment of the present invention that is similar to the embodiment shown in FIG. 7. Corresponding element numbers in FIGS. 7 and 8 refer to corresponding elements and as such, a duplication of description of the elements will be avoided. Seal rings 266a and 266b comprise rectangular or square cross-sectional rings rather than C-shaped rings. Seal rings 266a and 266b preferably comprise a metal and may alternatively comprise a fluoropolymer resin, for example. The valve seal assembly 200 shown does not have a built-in lip on the seat member 234. Seal rings 251 and 252 do not include optional support rings 153 and 158, as shown in FIG. 7.

Figure 9:
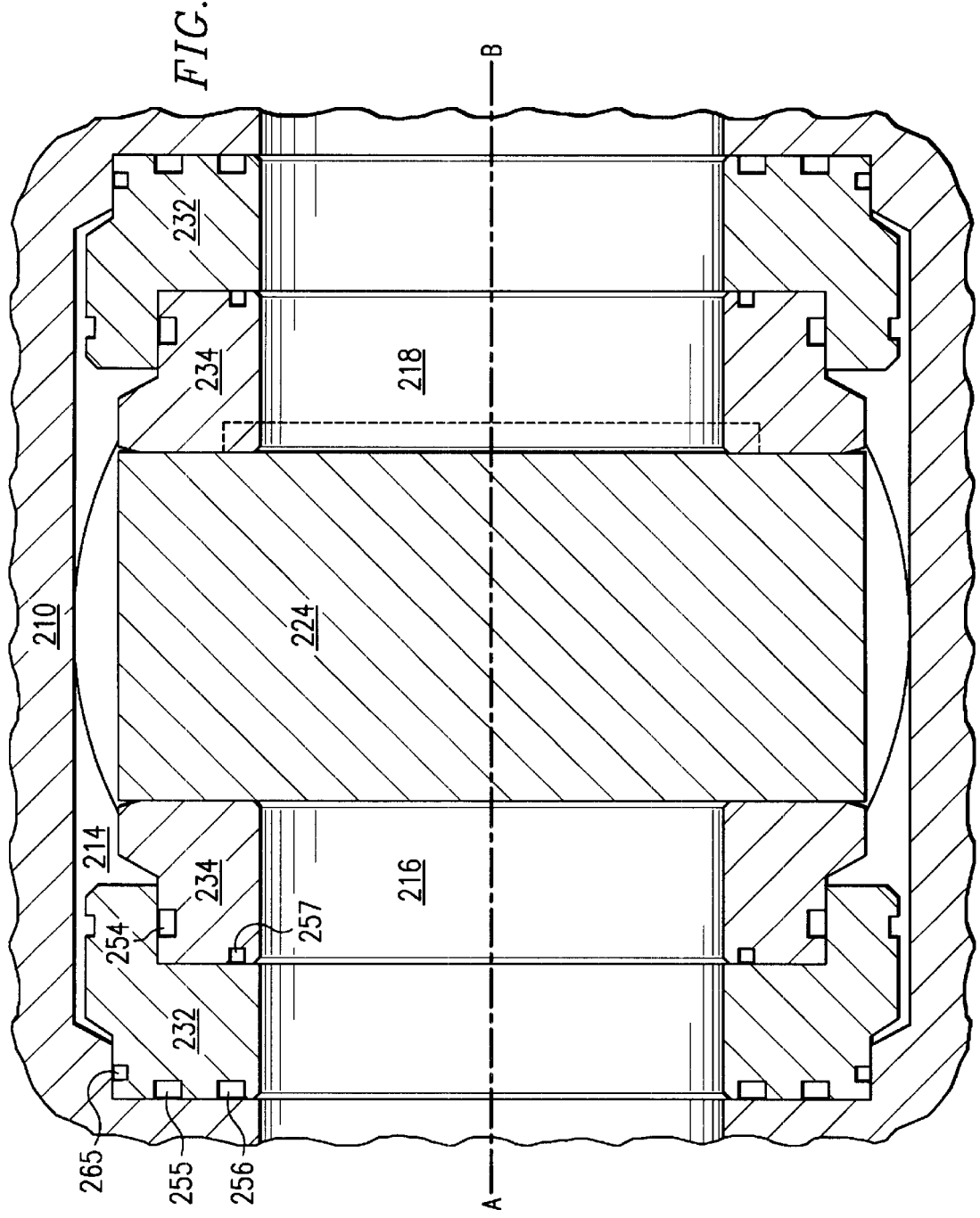
FIG. 9 illustrates a complete cross-sectional view of a portion of the seat member, pocket insert, valve body and gate of an embodiment of the invention with grooves in the pocket insert and seat member for accommodating the various seal and retainer rings within view.

FIG. 9 shows a full cross-sectional view of a portion of the gate valve seal assembly 200 fitted along a pipeline having a bore 216/218 about centerline A-B. FIG. 9 shows the top, bottom, and both sides of annular seat members 234 and pocket inserts 232. Grooves 254, 255, 256, 257, 265 for accommodating the various seal rings are visible in the pocket inserts 232 and seat members 234.

Figure 10:
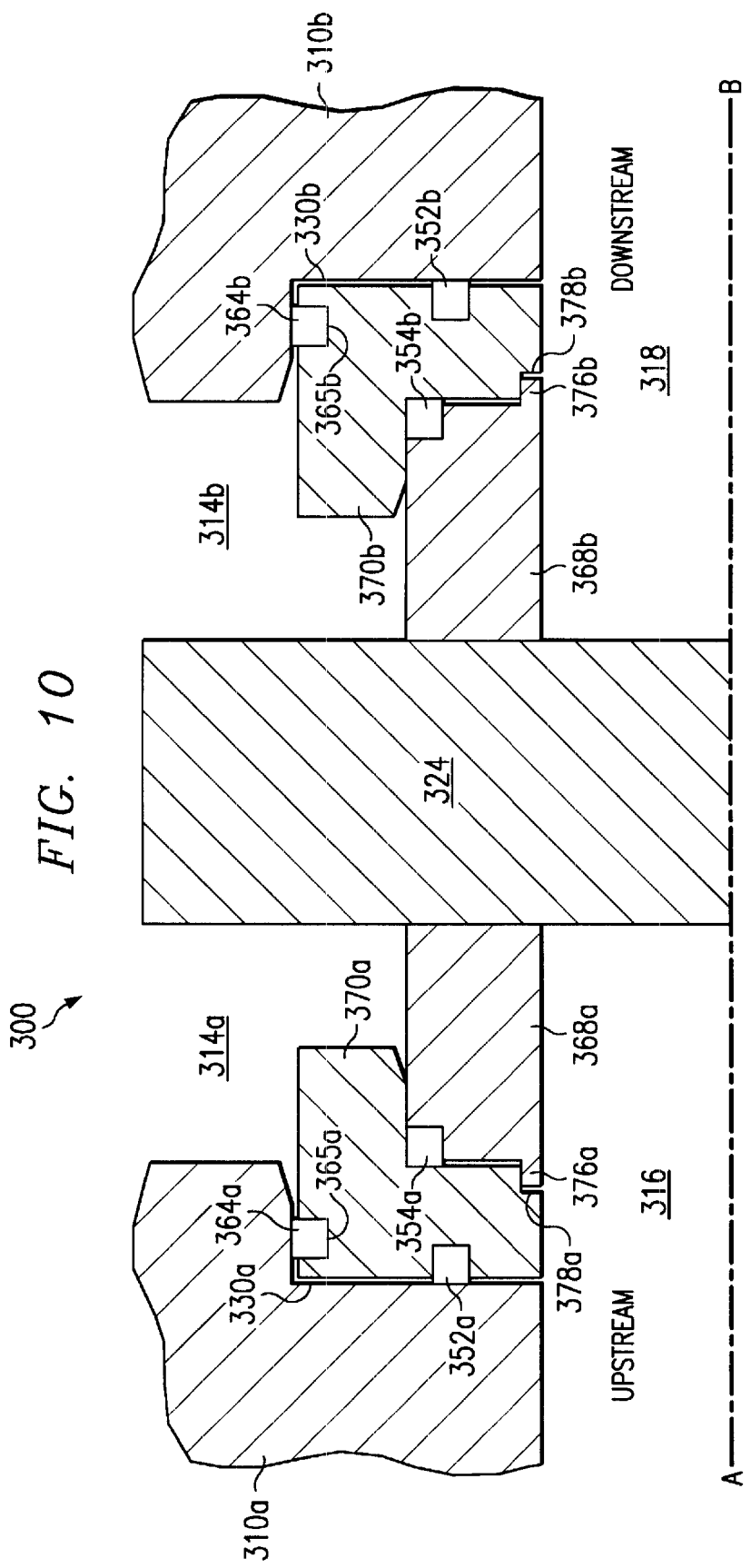
FIG. 10 illustrates an embodiment of the present invention, including a seat member with a built-in lip and a pocket insert with a retainer ring.

An embodiment of the present invention is shown in cross-section in FIG. 10 at 300. A first seat member or pocket insert 370 is adapted to fit within valve body 310 at pocket 330. Seat member 368 is adapted to fit in a telescoping fashion within pocket insert 370. Valve body 310, pocket insert 370, and seat member 368 preferably comprise steel or alternatively may comprise a material the same as the pipe material (not shown) that the valve seal assembly 300 is installed on, to prevent corrosion. Pocket insert 370 is preferably substantially L-shaped as shown. Seals 352 and 354 may comprise a fluoropolymer resin or O-rings, or other seals in the art.

A retainer or retaining ring 364 is positioned at the exterior annular surface of pocket insert 370 abutting the inner surface of the valve body pocket 330. Pocket insert 370 includes an exterior annular groove 365 near (or at, not shown) the L corner to accommodate retaining ring 364. Retainer ring 364 may comprise a fluoropolymer resin or metal, as examples, and is preferably split to allow fluid to flow around the retaining ring 364. Retainer ring 364 does not provide a seal, but rather, exerts a force towards the valve body to retain the pocket insert 370 within the pocket 330 in any position of the valve, including the vertical position. The retainer ring 364 has interference fit with the valve body pocket 330, and therefore, preferably the retainer ring 364 comprises a compressible material.

An additional retainer ring, not shown, may be disposed between seat member 368 and pocket insert 370, not shown, within an accommodating groove in the seat member 368, also not shown, as described in FIGS. 7 and 8 (retaining rings 154 and 254).

Seat member 368 includes a built-in annular lip 376 at the inner annular surface. Pocket insert 370 includes an annular groove 378 to accommodate the seat member built-in lip 376. The built-in lip 376 prevents debris and solid material from entering the space between pocket insert 370 and seat member 368.

Figure 11:
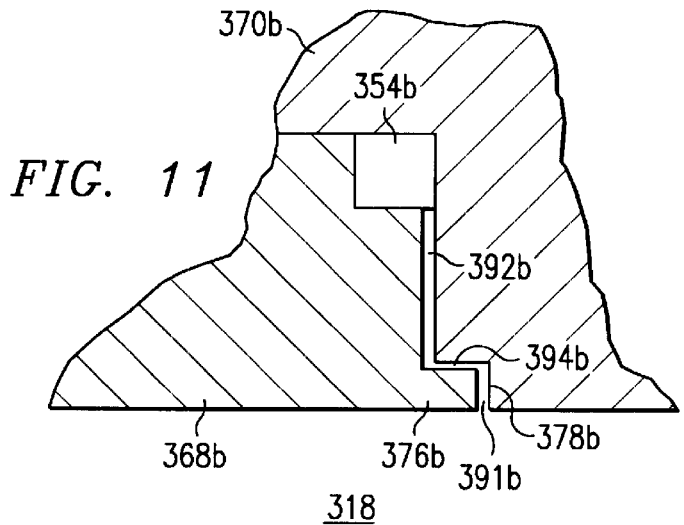
FIG. 11 is an enlarged view of the built-in lip region shown in FIG. 10.

To further prevent debris from entering the space between pocket insert 370 and seat member 368, built-in lip 376 and groove 378 may be designed to have a narrower space between them at the lip 376 than near bore 116/118. FIG. 11 illustrates an expanded view of the downstream "b" side of FIG. 10, with pocket insert 370b interfacing with seat member 368b at the built-in lip 376b. Preferably, spaces 391b and 392b perpendicular to bore 318 are larger than space 394b parallel to bore 318 by at least 2× and more preferably, 5×. For example, spaces 391b and 392b may be 0.010" and space 306 may be 0.002". The spacing differential helps ensure that debris do not enter the cavity containing seal 354b. The spacing differential also creates a permanent gap of around 0.010", during compression, for example, between pocket insert 370 and seat member 368, which reduces the pressure on the seal 354b.

Figure 12:
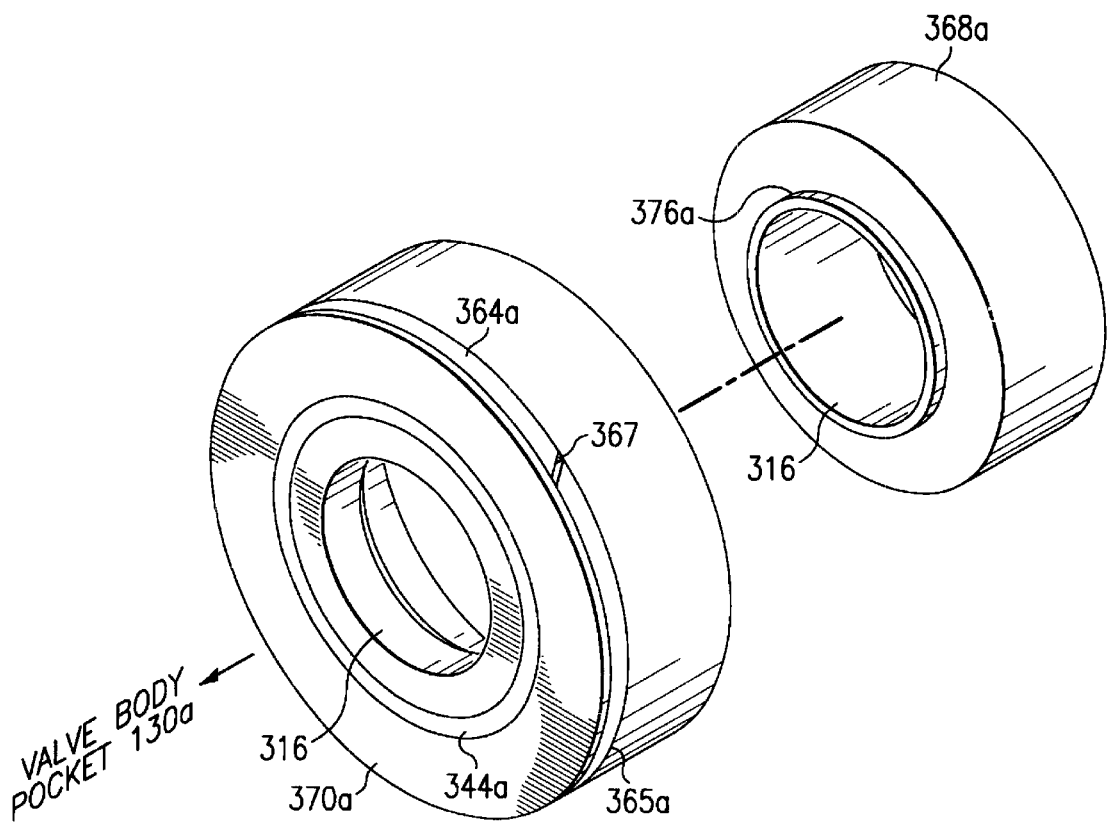
FIG. 12 shows a perspective view of the embodiment shown in FIG. 10.

FIG. 12 shows in a perspective view the telescoping assembly of the upstream seal assembly 300 into the valve body pocket 330a. Seat member 368a comprises a hollow cylindrical body about bore 316 having a built-in lip 376a. Seat member 368a is adapted to slide concentrically within pocket insert 370a. Pocket insert 370a also comprises a hollow cylindrical body about bore 316, with the body being substantially L-shaped to accommodate seat member 368a abutting the interior thereof. Retainer ring 364a snap-fits within exterior annular groove 365a of pocket insert 370a. Retainer ring 364a includes a split 367, which facilitates installation and prevents sealing the space between pocket 330a and pocket insert 370a. Pocket insert 370a includes seal 344a positioned within a groove designed therefore.

In FIGS. 10–12, the built-in lip 376 is shown to be formed on the seat member 368. Alternatively, the seat member or pocket insert 481 may include a built-in lip 482, as shown in an embodiment in FIG. 13. In this embodiment, seat member 484 includes an annular groove 486 to accommodate the built-in lip 482 on the pocket insert 481, as shown.

Figure 13:
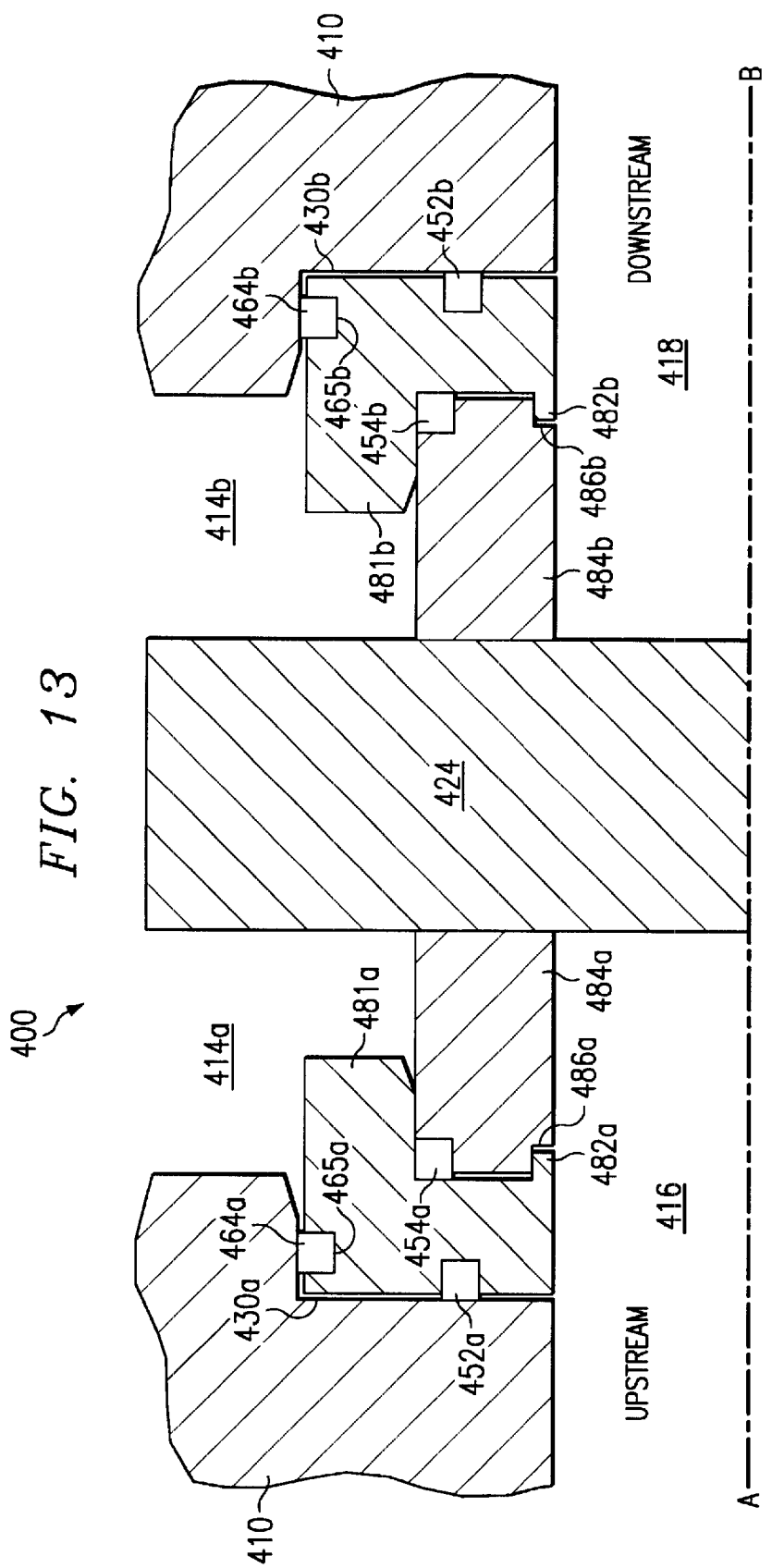
FIG. 13 illustrates an embodiment of the present invention, including a pocket insert including a built-in lip and a seat member having a corresponding lip-accommodating groove.

In FIGS. 10, 11 and 13, seals 352/452 between valve body pocket 330/430 and pocket insert 370/480, and seal 354/454 between seat member 368/484 and pocket insert 370/480 are shown. However, seals 352/452 and 354/454 are representative of any seal or combinations thereof. For example, seals 352/452/354/454 may comprise O-rings, fluoropolymer resin rings, metal rings, unidirectional U-shaped spring energized seals, and other spacers adapted to withstand high temperatures and pressures for oilfield valve applications. More than one seal may be used in each region where one is shown in the figures herein, and combinations of seals may be placed between the seat members and the valve body in accordance with embodiments of the present invention. The novel retainer ring 364/464 and built-in seat member lip 376/482 are advantageous in any sealing arrangement, including both upstream and downstream sealing assemblies.

Figure 14:
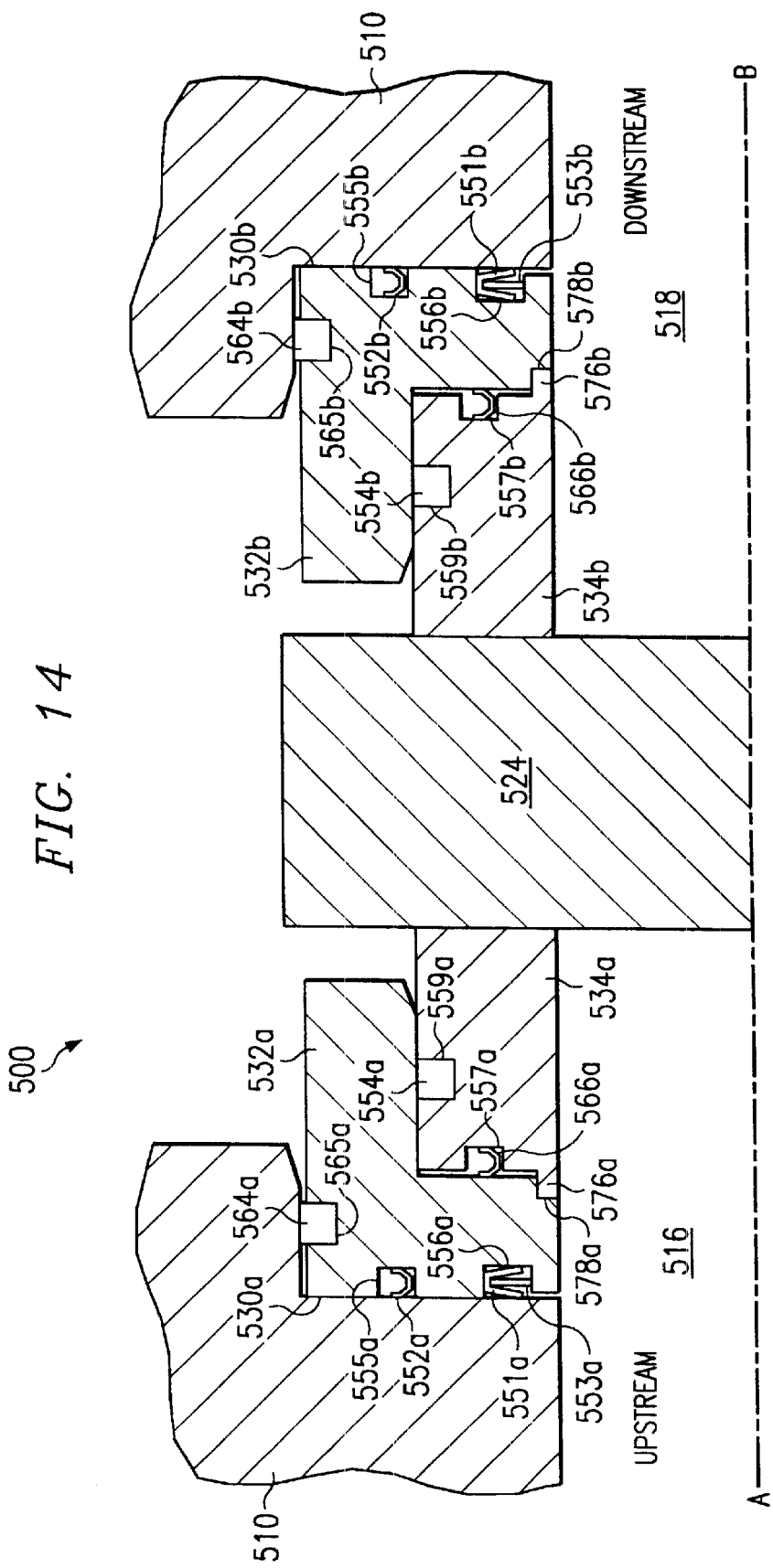
FIG. 14 illustrates a preferred embodiment having a C-shaped seal disposed between the seat member and the pocket insert, and a C-shaped seal and a U-shaped seal disposed between the pocket insert and the valve body.

FIG. 14 illustrates a preferred embodiment of the present invention, a valve sealing assembly 500 having an annular C-shaped seal 566 disposed between seat member 534 and fixed pocket insert 532 within seat member 534 annular groove 557. An annular C-shaped seal 552 is disposed between the pocket insert 532 and the valve body 510 within pocket insert 532 annular groove 555. C-shaped seals 552 and 566 preferably comprise a metal and are preferably oriented with the opening of the "C" positioned away from the borehole 516/518 to obtain a downstream seal design. A U-shaped annular seal 551 is also disposed between the pocket insert 532 and the valve body 510 within pocket insert 532 annular groove 556. Preferably, the U-shaped seal 551 comprises an outer high-temperature plastic U-shaped body comprising PTFE, for example. Alternatively, U-shaped seal rings 551/552 may comprise PEEK or PES, as examples. An optional support ring 553 is preferably disposed between the legs of the U-shaped seal 551. The support ring 553 preferably comprises polyphenol sulfide, and alternatively may comprise metal, for example. Support ring 553 provides mechanical support and functions to keep the U-shaped seal 551 from collapsing under pressure.

In each of the preferred embodiments described herein, advantageously, pocket insert 132/232/370/470/532 is fixed within the valve body 110/210/310/410/510 pocket 130/230/330/430/530. Because the pocket insert and valve body pocket insert interface is fixedly sealed, fluid does not enter between the pocket insert and valve body pocket. This prevents erosion of the valve body pocket. Fluid enters into cavity 114//214/314/414/514 through the cavity between the seat member and the pocket insert on the upstream "a" side. The pocket insert comprises a sacrificial element that is subject to erosion, rather than the valve body pocket being subject to erosion, as in prior art designs. Pocket insert 132/232/370/470/532 may be fixedly retained within valve body pocket by retainer ring 564, or alternatively, the pocket insert 132/232/370/470/532 dimensions may be designed to press-fit into the valve body pocket with an interference fit.

The annular grooves 155/156/157/159/164/178/255/256/ 257/259/265/365/378/465/486/555/556/557/559/564/578 and built-in lip 176/376/482/576 described herein are preferably machined, as will be understood by one skilled in the art. For example, computer numerically controlled (CNC) programming may be used to machine the seat members 134/234/368/468/534 and pocket inserts 132/232/370/470/ 532. Alternatively, the grooves 155/156/157/159/164/178/ 255/ 256/257/259/265/365/378/465/486/555/556/557/559/ 564/578 and built-in lip 176/376/482/576 may be molded-in, for example.

Some advantages of embodiments of the invention will next be described. Preferably, non-elastomeric seals are used for seal rings, avoiding the problems associated with elastomers such as explosive decompression, and the elaborate selection procedure required of elastomers for a particular service (e.g., $H_2S$, $CO_2$, methanol), high temperature and high pressure applications. The metal seal C-ring 166 allows fluid to enter the valve cavity 114 from the pipeline bore 116 during pressure applications, and equally allows the pressure in the cavity to bleed with the pipeline bore 116.

Some prior art upstream sealing designed valves have shortcomings due to 'through conduit sealing' ability, where an upstream sealing valve may give a false indication to operators that there is no cavity pressure when the valve is fully open, but potentially could be trapping up to the working pressure inside the body cavity. Advantageously, embodiments of the present invention described herein do not allow pressure to be trapped in the body cavity 114 when the valve engagement member 124 is in the fully closed or open position.

Embodiments of the present valve seal assembly 100 prevent the passage of well bore fluid proximate the body pocket 130, yet allow fluid to pass between seat member 132 and pocket insert 134, which are sacrificial components, and thus protect the body pocket 130 from corrosion and erosion. Because embodiments of the present pocket insert 134 are sacrificial components, the expensive process of Inconel™ inlaying of the body pockets 130 can be avoided.

Embodiments of the present invention allow equilibrium inside the gate valve body 114, preventing any damage to its sealing mechanism and components, even in subsea applications where a valve assembly can be subjected to working pressure plus hydrostatic pressure, which can be detrimental to seals.

Well bore pressure assistance is designed-in as a default and for fail-safe design applications, no additional drilling of holes or gate modifications are necessary in accordance with embodiments of the present invention.

Embodiments of the invention utilize a floating gate 124 with a T slot, which allow the gate to float in the direction of the well bore pressure and helps to maintain a flat sealing surface between gate 124 and seat members 134a and 134b.

Other advantages of embodiments of the invention include providing a seat member built-in lip 176/376 and accommodating groove 178/378 on pocket insert 132/370. This feature is beneficial to any valve sealing assembly having telescoping parts, for example. The built-in lip 176/376 prevents debris from entering the space between the pocket insert 132/370 and seat member 178/368, lengthening the life of pocket insert 132/370, seat member 178/368 and any seals 154/354 therebetween. Valve malfunction may be prevented by the use of the built-in lip 176/376.

The retaining rings 154/164/254/264/364/464 are advantageous in retaining the pocket insert within the valve body pocket, or the seat member within the pocket insert, even when the valve is placed in the vertical position. The valve may be repaired or serviced in the vertical position by the use of the retaining rings.

Although embodiments of the invention are described herein for use with gate valves, it is anticipated that the novel concepts described herein are beneficial in other valves for down-hole drilling pipes such as plug valves, for example. Other valves having rotating, reciprocating, sliding or otherwise moving elements or valve engaging members would benefit from the present seal assembly described herein, as examples.

While embodiments of the invention have been described with reference to illustrative embodiments, this description is not intended to be construed in a limiting sense. Various modifications in combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of sealing a valve engaging member to a valve body about a borehole, the valve body having a pocket on either side of the valve engaging member, the method comprising:

providing a first seat member having a substantially L-shaped cross-section within the valve body pocket;

providing a second seat member disposed within the first seat member coupled concentrically to the first seat member around the valve borehole, the second seat member sealingly coupled to the valve engaging member;

coupling a first seal ring between the first seat member and the valve body pocket;

coupling a second seal ring concentric to the first seal ring between the first seat member and the valve body pocket, the second seal ring having a larger diameter than the first seal ring diameter; and coupling a third seal ring between the first and second seating members.

2. The method according to claim 1, wherein coupling the first seal ring comprises coupling a U-shaped seal ring, the U opening being positioned away from the borehole centerline, and wherein coupling the second seal ring comprises coupling a U-shaped seal ring, the U opening being positioned towards the borehole centerline.

3. The method according to claim 1, wherein coupling the third seal ring comprises coupling a C-shaped seal ring.

4. The method according to claim 3 wherein providing a retainer ring comprises providing a split ring comprised of fluoropolymer resin or metal.

5. A valve sealing assembly for sealing a valve engaging member to a valve body, the valve engaging member having a first face and a second face, the valve body including first and second opposing annular valve body pockets disposed concentrically about a borehole, the valve body pockets being disposed on either side of the valve engaging member, the sealing assembly comprising:

a first annular seat member adapted to fixedly sealingly fit within the first annular valve body pocket, the first seat member having a substantially L-shaped cross-section, the L-shaped cross-section having a bottom and a side;

a first annular groove disposed within the first seat member L-shaped cross-section bottom;

a second annular groove disposed within the first seat member bottom, the second annular groove positioned concentrically with the first annular groove;

a first seal ring disposed between the first seat member and the first valve body pocket within the first seat member first groove;

a second seal ring disposed between the first seat member and the first valve body pocket within the first seat member second groove;

a second annular seat member adapted to sealingly fit within the first seat member, the second seat member including an annular groove disposed over the first seat member L-shaped bottom, the second seat member being adapted to sealingly couple to the valve engaging member first face; and a third seal ring disposed between the second seat member and the first seat member within the second seat member groove.

6. The valve sealing assembly according to claim 5, wherein at least a portion of at least one of the first seal ring, the second seal ring and the third seal ring comprises metal.

7. The valve sealing assembly according to claim 6, wherein at least one of the first seal ring, the second seal ring and the third seal ring includes an inner spring member, wherein the inner spring member is the portion of the first seal ring, the second seal ring or the third seal ring that comprises metal.

8. The valve sealing assembly according to claim 1, further comprising:
   a third annular seat member adapted to sealingly fit within the second annular valve body pocket, the third seat member having a substantially L-shaped cross-section, the L-shaped cross-section having a bottom and a side;
   a first annular groove disposed within the third seat member L-shaped cross-section bottom;
   a second annular groove disposed within the third seat member bottom, the second annular groove positioned concentrically with the first annular groove;
   a fourth seal ring disposed between the third seat member and the second valve body pocket within the third seat member first groove;
   a fifth seal ring disposed between the third seat member and the second valve body pocket within the third seat member second groove;
   a fourth annular seat member adapted to sealingly fit within the third seat member, the fourth seat member including an annular groove disposed over the first seat member L-shaped bottom, the fourth seat member being adapted to sealingly couple to the valve engaging member second face; and
   a sixth seal ring disposed between the fourth seat member and the third seat member within the fourth seat member groove, wherein fluid entering the borehole from an upstream borehole direction is sealed at the downstream borehole direction when the valve engaging member is engaged or closed.

9. The valve sealing assembly according to claim 8, wherein the first annular valve body pocket, first annular seat member, and second annular seat member comprise an upstream side of the valve sealing assembly, wherein the second annular valve body pocket, third annular seat member, and fourth annular seat member comprise the downstream side of the valve sealing assembly, wherein when fluid enters the borehole from the upstream direction into the upstream side, the first seal ring prevents the fluid from flowing between the first annular valve body pocket and the first annular seat member, and the third seal ring permits the fluid to flow between the first annular seat member and the second annular seat member towards the downstream side of the valve sealing assembly.

10. The valve sealing assembly according to claim 9, wherein the fifth seal ring prevents the fluid from flowing between the second annular valve body pocket and the third annular seat member into the borehole on the downstream side, and wherein the sixth seal ring prevents the fluid from flowing between the third annular seat member and the fourth annular seat member into the borehole on the downstream side.

11. The valve assembly according to claim 8, wherein the first annular valve body pocket, first annular seat member, and second annular seat member comprise a first component side; wherein the second annular valve body pocket, third annular seat member, and fourth annular seat member comprise a second component side, wherein the first component side and second component side are symmetric about the valve engaging member, and either the first component side or second component side are adapted to seal at the downstream direction.

12. The valve sealing assembly according to claim 5 in combination with said valve engaging member.

13. The valve sealing assembly according to claim 12, wherein the valve engaging member comprises a gate or plug valve.

14. The valve sealing assembly according to claim 5 in combination with a pipeline, the pipeline being coupled the valve body, wherein the borehole extends through at least a portion of the length of the pipeline.

15. The valve sealing assembly according to claim 5 wherein the first and second seal rings comprise U-shaped spring energized seal rings, and wherein the third seal ring comprises a C-shaped cross-section seal ring.

16. The valve sealing assembly according to claim 15, wherein the first and second seal rings comprise carbon-filled polytetrafluoroethylene (PTFE), and wherein the third seal ring comprises metal.

17. The valve sealing assembly according to claim 15, further comprising a support ring disposed within each of the U-shaped first and second seal rings.

18. The valve sealing assembly according to claim 17, wherein the support rings comprise polyphenol sulfide and include a split therein.

19. The valve sealing assembly according to claim 5, wherein the first annular seat member has an interference fit within the first annular valve body pocket.

20. The valve sealing assembly according to claim 5, further comprising:
   an annular groove formed within the exterior of the first annular seat member L-shaped cross-section side; and
   a first retaining ring disposed within the first annular seat member groove between the valve body pocket and the first annular seat member.

21. The valve sealing assembly according to claim 20, further comprising:
   an annular groove formed within the exterior of the second annular seat member, and
   a second retaining ring disposed within the second annular seat member groove between the first annular seat member and the second annular seat member.

22. The valve sealing assembly according to claim 5, further comprising:
   an annular groove formed within the exterior of the second annular seat member; and
   a retaining ring disposed within the second annular seat member groove between the first annular seat member and the second annular seat member.

23. The valve sealing assembly according to claim 5, wherein one of the seat members includes a built-in lip at the interior annular surface, wherein the other seat member interior annular surface includes an annular groove to accommodate the other seat member built-in lip.

24. A valve sealing assembly for sealing a valve engaging member to a valve body, the valve body including first and second opposing annular valve body pockets disposed concentrically about a borehole, the valve body pockets being disposed on either side of the valve engaging member, the sealing assembly comprising:
   a first annular seat member adapted to sealingly fit within one of the annular valve body pockets, the first seat member having a substantially L-shaped cross-section, the L-shaped cross-section having a bottom and a side, the first seat member having an annular groove along the side exterior;

at least one seal ring disposed between the first seat member and the valve body pocket;

a second annular seat member adapted to sealingly fit within the first seat member, the second seat member being adapted to sealingly couple to the valve engaging member;

a first retainer ring adapted to fit within the first seat member groove, wherein the first retainer ring is adapted to retain the first seat member within the valve body pocket; and at least one seal ring disposed between the first seat member and the second seat member.

25. The valve sealing assembly according to claim 24 wherein the first retainer ring comprises a split ring.

26. The valve sealing assembly according to claim 24 wherein the split first retainer ring comprises fluoropolymer resin or metal.

27. The valve sealing assembly according to claim 24, further comprising:

an annular groove along the exterior of the second seat member; and a second retainer ring adapted to fit within the second seat member groove, wherein the second retainer ring is adapted to retain the second seat member within the first seat member.

28. The valve sealing assembly according to claim 27 wherein the second retainer ring comprises a split ring.

29. The valve sealing assembly according to claim 27 wherein the second retainer ring comprises fluoropolymer resin or metal.

30. The valve sealing assembly according to claim 24, wherein one of the first and second seat members include a built-in lip at the interior annular surface, wherein the other seat member interior annular surface includes an annular groove to accommodate the other seat member built-in lip.

31. The valve sealing assembly according to claim 24 in combination with said valve engaging member.

32. The valve sealing assembly according to claim 31, wherein the valve engaging member is a gate or plug valve.

33. The valve sealing assembly according to claim 24 combination with a pipeline, the pipeline being coupled the valve body, wherein the borehole extends through at least a portion of the length of the pipeline.

34. A valve sealing assembly for sealing a valve engaging member to a valve body, the valve body including first and second opposing annular valve body pockets disposed concentrically about a borehole, the valve body pockets being disposed on either side of the valve engaging member, the sealing assembly comprising:

a first annular seat member adapted to sealingly fit within one of the annular valve body pockets, the first seat member having a substantially L-shaped cross-section, the L-shaped cross-section having a bottom and a side;

at least one seal ring disposed between the first seat member and the valve body pocket;

a second annular seat member adapted to sealingly fit within the first seat member, the second seat member being adapted to sealingly couple to the valve engaging member and including an annular groove along the exterior;

a first retainer ring adapted to fit within the second seat member groove, wherein the second retainer ring is adapted to retain the second seat member within the first seat member; and at least one seal ring disposed between the first seat member and the second seat member.

35. The valve sealing assembly according to claim 34 wherein the first retainer ring comprises a split ring.

36. The valve sealing assembly according to claim 35 wherein the split first retainer ring comprises fluoropolymer resin or metal.

37. The valve sealing assembly according to claim 34, wherein one of the first and second seat members include a built-in lip at the interior annular surface, wherein the other seat member interior annular surface includes a groove to accommodate the other seat member built-in lip.

38. The valve sealing assembly according to claim 34 in combination with said valve engaging member.

39. The valve sealing assembly according to claim 34 in combination with a pipeline, the pipeline being coupled the valve body, wherein the borehole extends through at least a portion of the length of the pipeline.

40. A valve sealing assembly for sealing a valve engaging member to a valve body, the valve engaging member having a first face and a second face, the valve body including first and second opposing annular valve body pockets disposed concentrically about a borehole, the valve body pockets being disposed on either side of the valve engaging member, the valve sealing assembly comprising:

a first annular seat member adapted to sealingly fit within the first annular valve body pocket;

a second annular seat member adapted to sealingly fit within the first seat member, the second seat member, the second seat member being adapted to sealingly couple to the valve engaging member first face;

a third annular seat member adapted to sealingly fit within the second annular valve body pocket;

a fourth annular seat member adapted to sealingly fit within the third seat member, the fourth seat member being adapted to sealingly couple to the valve engaging member second face;

means for preventing fluid to flow between the first annular valve body and the first annular seat member when fluid enters the borehole from an upstream direction and the valve member is engaged;

means for allowing the fluid from the upstream direction to pass between the first annular seat member and the second annular seat member towards a downstream direction past the valve engaging member;

means for preventing the fluid from flowing between the second annular valve body and the third annular seat member; and means for preventing the fluid from flowing between the third annular seat member and the fourth annular seat member.

41. A valve sealing assembly, including:

a valve body including first and second opposing annular valve body pockets disposed concentrically about a borehole, the borehole having a first direction and a second direction, the first valve body pocket being proximate the first direction and the second valve body pocket being proximate the second direction;

a valve engaging member having a first face and a second face coupled between the valve body pockets;

a first annular seat member adapted to sealingly fit within the first annular valve body pocket;

a second annular seat member adapted to sealingly fit within the first seat member, the second seat member, the second seat member being adapted to sealingly couple to the valve engaging member first face;

a third annular seat member adapted to sealingly fit within the second annular valve body pocket;

a fourth annular seat member adapted to sealingly fit within the third seat member, the fourth seat member being adapted to sealingly couple to the valve engaging member second face;

a first seal ring adapted to prevent fluid from flowing between the first annular valve body and the first annular seat member when fluid enters the borehole from the first direction and the valve member is engaged;

a second seal ring adapted to allow the fluid from the first direction to pass between the first annular seat member and the second annular seat member towards the borehole second direction, past the valve engaging member;

a third seal ring adapted to prevent the fluid from flowing between the second annular valve body and the third annular seat member; and a fourth seal ring adapted to prevent the fluid from flowing between the third annular seat member and the fourth annular seat member.

42. The valve sealing assembly according to claim 41, further comprising a fifth seal ring adapted to prevent fluid from flowing from the borehole second direction between the second annular valve body pocket and the third seat member; and a sixth seal ring adapted to prevent fluid from flowing from the borehole second direction between the first annular valve body pocket and the first seat member; wherein when fluid enters the borehole from the second direction, the fifth seal ring prevents fluid flow between the second annular valve body pocket and the third seat member, the fourth seal ring allow fluid to flow between the third seat member and the fourth seat member, the second seal ring prevents fluid from flowing between the first seat member and the second seat member, and the sixth seal ring prevents fluid from flowing between the first annular valve body pocket and the first seat member.

* * * * *

UNITED STATES PATENT AND TRADEMARK OFFICE
CERTIFICATE OF CORRECTION

PATENT NO. : 6,664,572 B2
DATED : December 16, 2003
INVENTOR(S) : Chatufale

It is certified that error appears in the above-identified patent and that said Letters Patent is hereby corrected as shown below:

Column 15,
Line 10, replace "Claim 1" with -- Claim 5 --.

Column 17,
Line 43, replace "combination" with -- in combination --.

Signed and Sealed this

Eighteenth Day of May, 2004

JON W. DUDAS
*Acting Director of the United States Patent and Trademark Office*